United States Patent [19]

Beasley

[11] 4,164,389
[45] Aug. 14, 1979

[54] APPARATUS FOR FORMING EXPANDED PANELS

[75] Inventor: Donald R. Beasley, Bronxville, N.Y.

[73] Assignee: Norfield Corporation, Danbury, Conn.

[21] Appl. No.: 922,198

[22] Filed: Jul. 5, 1978

Related U.S. Application Data

[62] Division of Ser. No. 763,097, Jan. 27, 1977, Pat. No. 4,113,909.

[51] Int. Cl.² ............... B29C 1/00; B29C 17/00; B30B 15/00
[52] U.S. Cl. .................................. 425/406; 425/411
[58] Field of Search ............... 425/406, 411, 110, 812; 264/164

[56] References Cited

U.S. PATENT DOCUMENTS

| 3,597,796 | 8/1971 | Ehrlich | 425/411 X |
|---|---|---|---|
| 3,640,660 | 2/1972 | De Mets | 425/411 X |
| 3,746,488 | 7/1973 | Messenger | 425/406 X |
| 3,919,378 | 11/1975 | Sinarook | 264/164 |
| 3,919,379 | 11/1975 | Sinarook | 425/812 |
| 3,919,380 | 11/1975 | Sinarook et al. | 425/812 |
| 3,919,381 | 11/1975 | Sinarook | 425/812 |
| 3,919,445 | 11/1975 | Sinarook | 425/812 |
| 3,969,051 | 7/1976 | Hovila | 425/406 X |
| 4,017,239 | 4/1977 | O'Connell et al. | 425/110 X |

Primary Examiner—J. Howard Flint, Jr.
Attorney, Agent, or Firm—Kenyon & Kenyon

[57] ABSTRACT

In order to make large panels of expanded thermoformable material in a process in which a blank of the material is placed between two heated mold plates, the blank adhered to the plates by hot tack adhesion; the plates separated and the expanded material cooled, while maintaining commercial tolerances, the mold plates are supported on elongated mounting studs.

10 Claims, 3 Drawing Figures

APPARATUS FOR FORMING EXPANDED PANELS

This is a division of application Ser. No. 763,097, filed Jan. 27, 1977, now U.S. Pat. No. 4,113,909.

BACKGROUND OF THE INVENTION

This invention relates to apparatus by which a plate or press must be held in a fixed position during a wide range of thermal cycling such as in the production of expanded thermoformable materials and products in general and more particularly to an improved apparatus for maintaining a press or plate so fixed. With respect to producing thermoformable products, it permits producing larger panels of such materials than was heretofore possible.

In general terms, an important type of apparatus to which the present invention relates is that disclosed in a series of U.S. Pat. Nos. 3,919,445; 3,919,380; 3,919,381 and 3,919,378, all issued Nov. 11, 1975 to Walter H. Smarook. Basically, as disclosed in U.S. Pat. No. 3,919,445 the process is one in which a blank of thermoplastic polymeric material is placed between two molds of a heated press. The temperature of the mold plates is about five or ten degrees above the temperature at which the thermoplastic material exhibits hot tack adhesion. The mold plates are separated apart and the adhesive forces of the polymeric material to the mold paltes are greater than the cohesive flow properties of the polymeric material itself during the plate separation or expansion step. Thus, it is possible to mechanically move the mold plates a certain distance apart with the polymeric material bonded to the surfaces thereof without causing a rupture of the adhesion between the surfaces and the fused material. The plates are separated causing the panel to take on a new internal geometry and the plates then cooled to solidify the expanded panel. During the process it is mandatory that the plate surfaces be parallel to each other within a few thousands of an inch, first during the melting stage, or else the plastic adhesion will not become accomplished, and finally, during the cooling state, or else the final pattern will not meet commercial standards of thickness uniformity. Typically, temperature cycling can range between 60° to 700° F.; a more common range being from 100° to 400° F. Thus, a fundamental problem in this process is that the metal mold plates, when subjected to temperature changes, also undergo dimensional changes and, when fixed to a supporting frame which is, of course, necessary they tend to bend so as to lose their parallelism. In addition, buckling of the supporting frame can also occur. Most developmental work in these processes described in aforementioned patents was done on six inch squares. Maintaining parallelism with such a small size is not particularly difficult. However, attempts to make larger size panels, up until the time of the present invention, have not been particularly successful. Even panels in a size as small as 14×24 inches have proven problematic. There is, however, a need for larger panels, for example, panels of sizes up to and larger than 4×10 feet. For example, such panels can be used as floating roof covers in chemical and protroleum tanks to reduce pollution and evaporation loss. There are, of course, many other applications for such panels, some of which require high tolerances, particularly when a plurality of panels are bonded or fitted together, e.g. office partitions and desk tops.

Thus, it can be seen that there is a need for an improved method and apparatus for carrying out an expansion process with thermoformable material so as to produce larger size products, such as panels, which are commercially acceptable.

In general terms, there is a need for a method and apparatus for holding large presses or plates fixed during thermal cycling.

SUMMARY OF THE INVENTION

The present invention provides a solution to this problem. Deviating from the previous manner of mounting in which I beams were mounted directly to the parallel press platens of the press machine used to move the molds apart and together, an arrangement which permits relative movement between the machine and the mold is used in the apparatus of the present invention. In accordance with the present invention, each of the molds is connected to the machine frame utilizing a plurality of elongated mounting studs. It has been discovered that when making thermoformable panels of a size of 4×10 feet, a length of these mounting studs greater than twelve inches is necessary in order to obtain molded panels which meet tolerence requirements and to achieve repeatability.

The construction of the present invention avoids problems found in other mounting arrangements. For example, a mounting arrangement in which the mounting of the molds was made directly to I beams which were in turn directly mounted to the machine frame with the mold mounting bolts disposed so as to permit free sliding movement was found to be completely unsatisfactory resulting in a bowing which caused a three-sixteenths deviation between the ends and the middle. This is thought to be the result of the bolts not sliding freely and heat from the mold warping the I beams and machine frame. Even attempts at improving the sliding of the mounting bolts through the use of Teflon washers and insulating the mold from the I beams with suitable insulators does not give effective results. Although such steps will result in improvement, it is still difficult to obtain panel repeatability which meets commercial standards. Furthermore, even the use of mounting bolts of the type used in the present invention which are twelve inches long or shorter will not permit repeatably satisfactory results when making panels which have a size of 4×10 feet. Only when the mounting bolt length is increased above twelve inches, for example, sixteen inches, can tolerances be maintained in this size of panel. With sixteen inch mounting studs, thickness deviation has been reduced to 10 mils with the apparatus of the present invention.

With the mold mounting of the present invention, utilizing sixteen inch studs, thermal effects on the frame are reduced to insignificance. The predominant distortion effect is the horizontal movement of the mounting studs. Typically, with a horizontal mold plate and a 300° temperature difference there will be a change in length of approximately 0.23 inches on each side. The effect of this horizontal change on the vertical position has been calculated to be approximately 1.6 mils for each mold plate or a total of 3.2 mils. This is consistent with measurements made on actual molded panels and is well within the tolerances required for commercial grade panels.

DETAILED DESCRIPTION OF THE INVENTION

Figure 1:
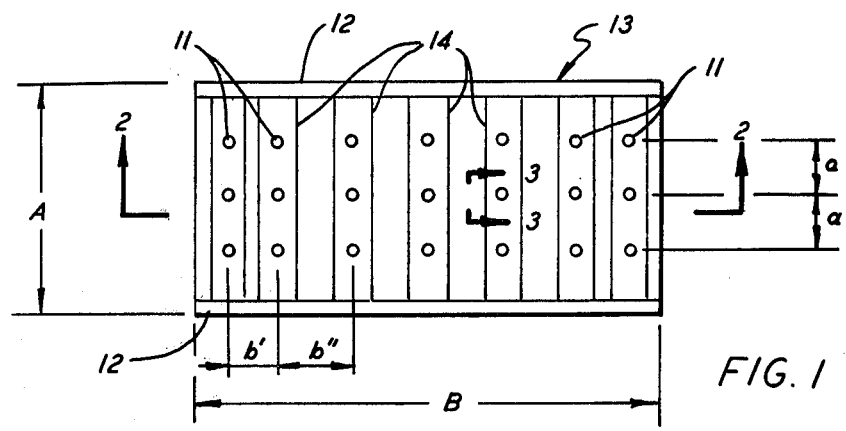
FIG. 1 is a plan vew of a portion of the machine platen illustrating the location of the mounting studs.
Figure 2:
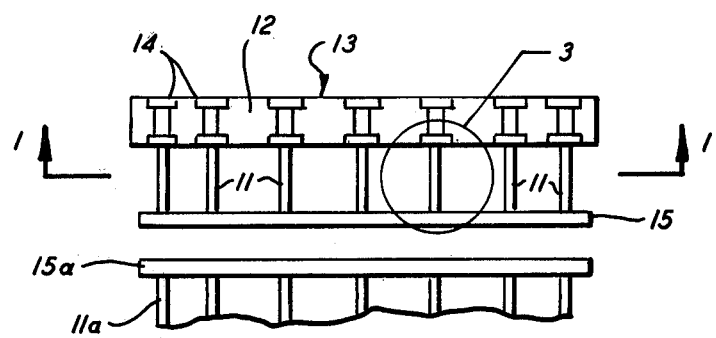
FIG. 2 is a side view of the arrangement of FIG. 1 also showing the mold plate attached to the machine platen.
Figure 3:
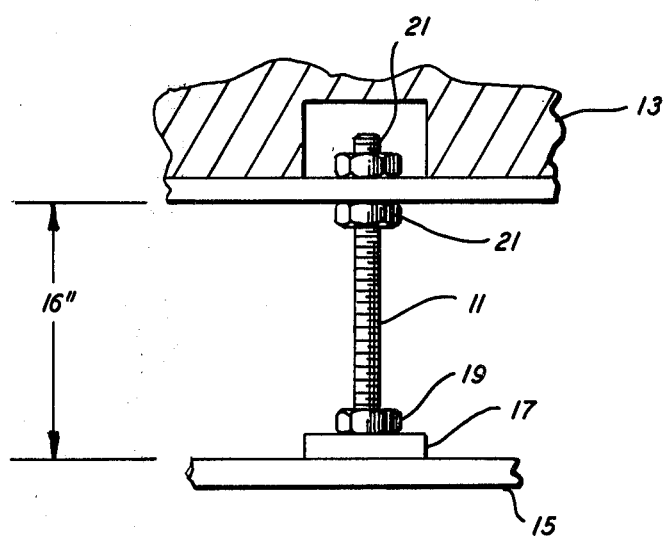
FIG. 3 is a detail of FIG. 2 illustrating in more detail the mounting arrangement.

FIGS. 1 and 2 illustrate the general arrangement of the apparatus of the present invention. FIG. 1 is a view of the attachment of the mounting studs 11 of the present invention to the machine frame platen 13, more specifically the upper platen 13 of the machine frame. The machine frame platen illustrated comprises two 8 inch steel channels 12 with transverse 8 inch steel I beams 14 disposed therebetween. As illustrated, three rows of mounting bolts are used. With the exception of those on the ends, the mounting bolts have equal spacing in the horizontal direction equal to b''. At the ends there is only a spacing of b' between mounting studs. The three rows of mounting studs 11 are separated from each other by a distance designated a. Typically, for a 4×10 panel, i.e. where the dimension A is 4 feet and the dimension B 10 feet, the distance a will be 17 inches with the middle row of mounting studs 11 on the center line, the distance b' will be 8 inches and the distance b'' 13 inches. FIG. 2 illustrates the machine platen 13 once again along with the mounting studs 11 and, at the end of the mounting studs 11, the mold plate 15. Shown also is a portion of the bottom mold plate 15a which is attached with similar bolts 11a to the opposing machine frame platen (now shown). Finally, FIG. 3 illustrates in more detail the attachment of the mold 15 to the machine frame 13. As illustrated, each mounting stud 11, which may be a ⅜-11 threaded rod is attached to a threaded block 17 which is welded or otherwise fastened to the mold plate with a lock nut 19 used to secure the threaded rod 11 in place. The threaded rod is passed through a suitable hole in the machine platen 13 with an opening provided thereabove so that lock nuts 21 can be fastened on opposing sides of the machine frame. The distance between the bottom of the machine frame 13 and the top of the mold plate 15, indicated as the distance C on the figure, when molding plates which are 4 by 8 feet should be at least 16 inches. In general terms, the amount of thermal expansion X of a plate in either direction as measured from the center line would be equal to B/2 times the coefficient of thermal expansion times $\Delta t$, where $\Delta t$ is the temperature change. For a 4×10 foot panel the equation becomes $X=60$ in. $\times 13 \times 10^{-6}$ in/in/°F. $\times 300°$ F. $=0.23$ inches. The change D in vertical dimensions because of such a horizontal expansion will be equal to $C=\sqrt{C^2-X^2}$. In the present example, C is equal to 16 inches and X equals 0.23 inches. Solving for the above equation results in the vertical distance D being equal to 1.6 mils. In general terms, when panels of a different size are being made, the length of the bolts should selected to satisfy the quation $D=C-\sqrt{C^2-X^2}$ where D one-half the maximum deviation permissable in panel thickness, (since there are two molds, each will make a contribution to the thickness deviation), C the length of the bolts and X the amount of thermal expansion in one half of the mold based on the mold material used and the temperature differential to be employed.

Although the present invention has been disclosed in connection with a process for thermoformable materials, it will be recognized by those skilled in the art that it is generally applicable to any process where a plate or press must be held fixed such as in reaction injection molding (RIM).

I claim:

1. In a device for expanding the cross section of a blank of thermoformable material which includes a machine having first and second opposed press platens; means for controlling the spacing of the press platens, first and second molding plates; and means attaching the mold plates to the press plates, the improvement comprising the means attaching the press platens comprising:

(a) a plurality of elongated studs distributed over the area of the molding plates the length of said studs being such as to satisfy the equation: $D=C-\sqrt{C^2-X^2}$ where D equals one-half the maximum deviation permissable in panel thickness, C the length of the bolts and X the amount of thermal expansion in one half of the mold based on the mold material used and the temperature differential to be employed;

(b) means for attaching one end of each of said studs to a press platen; and (c) means for attaching the other end of said studs to a mold plate.

2. Apparatus according to claim 1 wherein said thermoformable material has a length of approximately 10 feet and wherein said studs are approximately 16 inches long.

3. Apparatus according to claim 1 wherein said press platens are equipped with openings through which said studs may pass and wherein said means for attaching to said press platens comprise lock nuts on each side of said openings.

4. Apparatus according to claim 1 wherein said means for attaching said studs to said mold plates comprise threaded blocks rigidly attached to said mold paltes and a lock nut for locking said studs in place after being screwed into said threaded blocks.

5. Apparatus according to claim 1 wherein said studs are arranged in rows.

6. Apparatus according to claim 5 wherein the two studs on each end of each row are spaced closer to each other than the remaining studs.

7. Apparatus according to claim 6 wherein said thermoformable material is approximately 10 feet long and 4 feet wide and wherein each row of studs comprises seven studs.

8. Apparatus according to claim 7 wherein said end studs of each row are spaced approximately 8 inches apart and the remaining studs approximately 13 inches apart.

9. Apparatus according to claim 8 wherein said rows are spaced approximately 17 inches apart.

10. In a device which includes a machine having first and second flat planar members; means for controlling the spacing of the planar members, and means attaching the planar members to a support structure, the improvement comprising the means attaching the planar members comprising:

(a) a plurality of elongated studs distributed over the area of the planar members the length of said studs being such as to satisfy the equation:

$D = C - \sqrt{C^2 - X^2}$ where D equals the maximum deviation permissable in bending of the member C the length of the bolts and X the amount of thermal expansion in the planar members based on the material of which they are made and the temperature differential to be employed;

(b) means for attaching one end of each of said studs to the support structure; and (c) means for attaching the other end of said studs to a planar member.

* * * * *